Dec. 5, 1967 C. B. KING 3,356,549
METHOD AND APPARATUS FOR BONDING A PLASTICS
SLEEVE ONTO A METALLIC BODY
Filed July 31, 1964 3 Sheets-Sheet 1

INVENTOR
CHARLES B. KING

BY

ATTORNEYS

Dec. 5, 1967  C. B. KING  3,356,549
METHOD AND APPARATUS FOR BONDING A PLASTICS
SLEEVE ONTO A METALLIC BODY
Filed July 31, 1964  3 Sheets-Sheet 2

INVENTOR
CHARLES B. KING

BY
ATTORNEYS

INVENTOR
CHARLES B. KING

United States Patent Office 3,356,549
Patented Dec. 5, 1967

3,356,549
METHOD AND APPARATUS FOR BONDING A PLASTICS SLEEVE ONTO A METALLIC BODY
Charles B. King, Hampton, Va., assignor to the United States of America as represented by the Administrator of the National Aeronautics and Space Administration
Filed July 31, 1964, Ser. No. 386,800
20 Claims. (Cl. 156—3)

ABSTRACT OF THE DISCLOSURE

A method and apparatus for bonding a plastics sleeve onto a metallic body wherein a uniform adhesive bond line gap is maintained between the sleeve and body along the entire sleeve length.

---

The invention described herein may be manufactured or used by or for the Government of the United States of America for governmental purposes without the payment of any royalties thereon or therefor.

This invention relates generally to a bonding procedure for attaching polytetrafluoroethylene to a metallic surface, and relates with particularity to the bonding of a polytetrafluoroethylene thermal protective sleeve to a truncated conical magnesium alloy structural shell component.

The metal telemetry antennas of certain high velocity reentry vehicles cannot function properly unless they are adequately protected from the severe heating conditions encountered during reentry into the earth's atmosphere after a spatial flight. In order to permit data telemetry to ground stations during reentry and after the severe heating caused by the reentry conditions has ceased, the thermal protection material used over the telemetry antennas must not be charred or thermally degraded to such an extent as to seriously attenuate radio transmission. One of the presently known thermal protective materials which is capable of protecting metal telemetry antennas of reentry vehicles, while also resisting thermal degradation, has been found to be polytetrafluoroethylene, commercially available as Teflon, a product of the Du Pont Company. One prior art process for bonding Teflon sheets to prepared surfaces is described in United States Patent 2,984,599 to George D. Edwards et al. Due to the dissimilar thermal coefficients of expansion for Teflon and metallic telemetry antenna components employed for various reentry vehicles, serious difficulty has been experienced in adequately attaching the protective plastics of sufficient thickness to the antenna in such manner as to protect the antenna components during reentry, while also enabling telemetry transmission.

Accordingly, it is an object of the present invention to provide a novel process for attaching a thermal protective plastics to a metal surface.

Another object of the present invention is to provide a novel process for bonding polytetrafluoroethylene to a magnesium alloy having a dissimilar thermal coefficient of expansion.

A further object of the present invention is to provide a novel process for obtaining a uniform bond line gap between a plastics jacketing material and a substrate of a different material.

A further object of the present invention is to provide a new and improved method of bonding a polytetrafluoroethylene protective lamination to another surface.

An additional object of the present invention is the provision of a novel process for acquiring a void-free bond between a plastics lamination and a metallic surface.

Yet another object of the instant invention is a novel bonding fixture for attaching a contoured thermal protective plastics sleeve to a reentry vehicle antenna component.

According to the present invention, the foregoing and other objects are attained by providing a truncated conical metal alloy sleeve, composed of approximately three percent thorium and ninety-seven percent magnesium alloy, and machined to the dimensions desired. This metal alloy sleeve serves as the metal antenna structure for a reentry vehicle, and is provided with a bonded thermal protective sleeve of machined polytetrafluoroethylene. When initially machined, this plastics sleeve has substantially the same internal diameter as the external diameter of the metallic antenna. Upon subjecting both components to a temperature of approximately 200° F., the plastics sleeve undergoes greater thermal expansion than that of the metal antenna to permit nesting of the two components. A plurality of circumferentially disposed radial projections are provided on the exterior surface of the metal surface of such length as to maintain the nested components separated a controlled gap distance throughout their length. This gap is filled with a thermal setting adhesive and the resulting structure is then further heated and pressurized to cure the adhesive and effect a rigid bond between the two elements capable of retaining the parts in relatively fixed position during sustained high temperature reentry conditions.

A more complete appreciation and many of the attendant advantages thereof will be readily apparent as the same becomes better understood by reference to the following detailed description when considered in connection with the accompanying drawings wherein.

Figure 1:
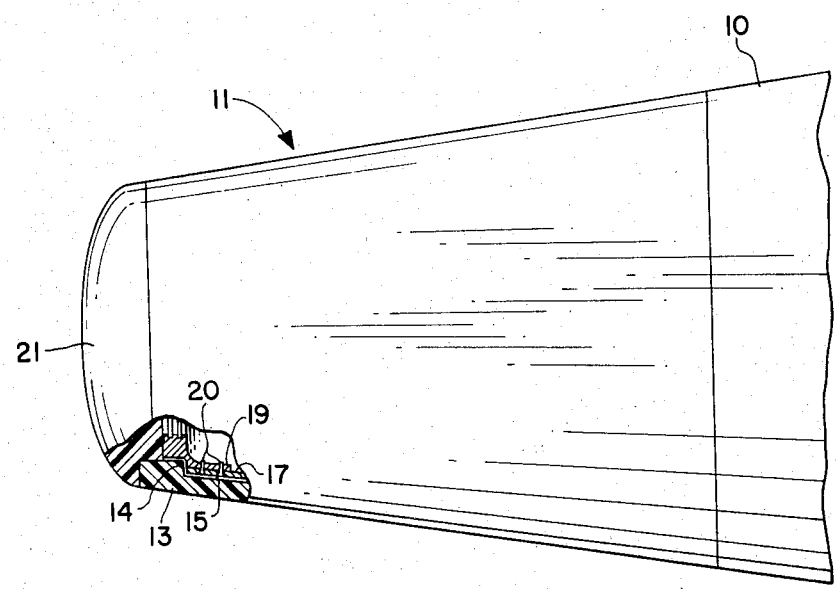
FIG. 1 is a view, with parts in section, of a space vehicle reentry nose cone having a protected metal antenna structure constructed in accordance to the present invention.

Referring now to the drawings wherein like reference numerals designate identical or corresponding parts throughout the several views, and more particularly to FIG. 1, there is shown a space vehicle 10 having a nose cone antenna component prepared in accordance with the present invention, and generally designated by the reference numeral 11. Nose cone 11 includes a polytetrafluoroethylene thermal protective sleeve 13 adhesively bonded by adhesive layer 15 to a thorium-magnesium alloy truncated conical liner 17. A tubular insert 19, machined from stainless steel, or like material, is attached to the interior surface of liner 17 by rivets 20, or other conventional means, as will be further explained hereinafter. Insert 19 threadingly receives and attaches ablation tip shielding 21 to vehicle 10 which serves to provide the major thermal protection required for nose cone 11 during its reentry into the earth's atmosphere after a space mission. The magnesium alloy liner 17, in the form of a hollow frustum, or truncated cone, serves as the metal antenna for conveying telemetry signals back to earth receiving stations during the flight of space vehicle 10 and, for this reason, must be thermally protected against the extreme heat conditions encountered during the reentry phase of the flight program. The plastics, polytetrafluoroethylene or Teflon, has proved quite capable of providing the needed thermal protection for antennas of this type while also permitting the transmission of telemetry signals therethrough. In order to prevent hot spots being formed on the protective sleeve, which could result in burn-through and subsequent damage or disintegration of the magnesium antenna, it is essential that the adhesive bond employed to maintain the thermal protective sleeve 13 in position on liner 17 be of substantially uniform thickness and free of voids throughout the length of the two components.

Figure 2:
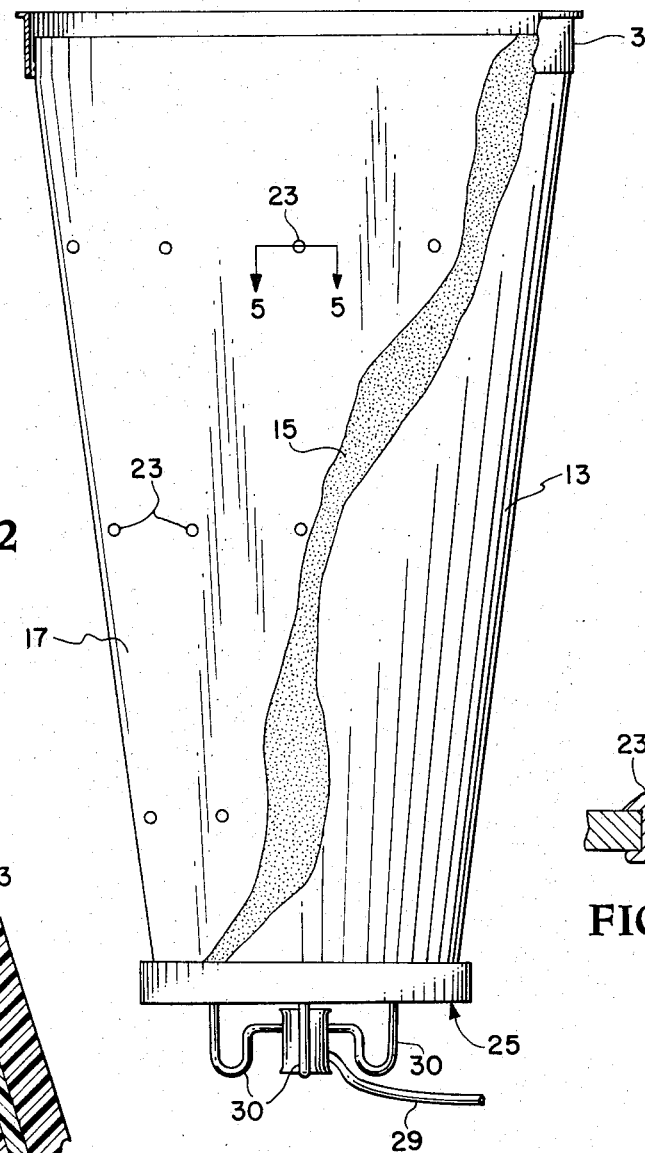
FIG. 2 is a view, with parts broken away, showing the adhesive transfer bonding fixture and overflow trap as attached to a magnesium alloy antenna structure and plastics sleeve during the bonding process of the present invention.
Figure 5:
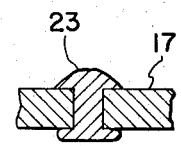
FIG. 5 is an enlarged view taken along lines 5—5 of FIG. 2.

Referring now more particularly to FIG. 2, the adhesive transfer bonding fixture employed to center shell 17 within sleeve 13, in position for bonding the two components, is shown, and generally designated by reference numeral 25. As shown therein, an adhesive conduit line 29 leads to fixture 25 and is divided, adjacent fixture 25, into a plurality of tubular channels 30. The tubular channels 30 serve to transfer adhesive into the gap formed between sleeve 13 and liner 17, as will be further explained hereinafter. Also, as shown in this view, rows of spaced small brazier or round head rivets 23 are conventionally attached about the outer surface of shell 17, the function of which will also be further explained hereinafter. The structural details of a single rivet 23 is illustrated in FIG. 5. Rivets 23 may be of the type known in the art as "blind" rivets, or the like. An annular overflow reservoir trap 33 (FIG. 2) is frictionally positioned about the large end of sleeve 13 so as to form a concentric reservoir to receive any excess of the adhesive during the bonding process.

Figure 3:
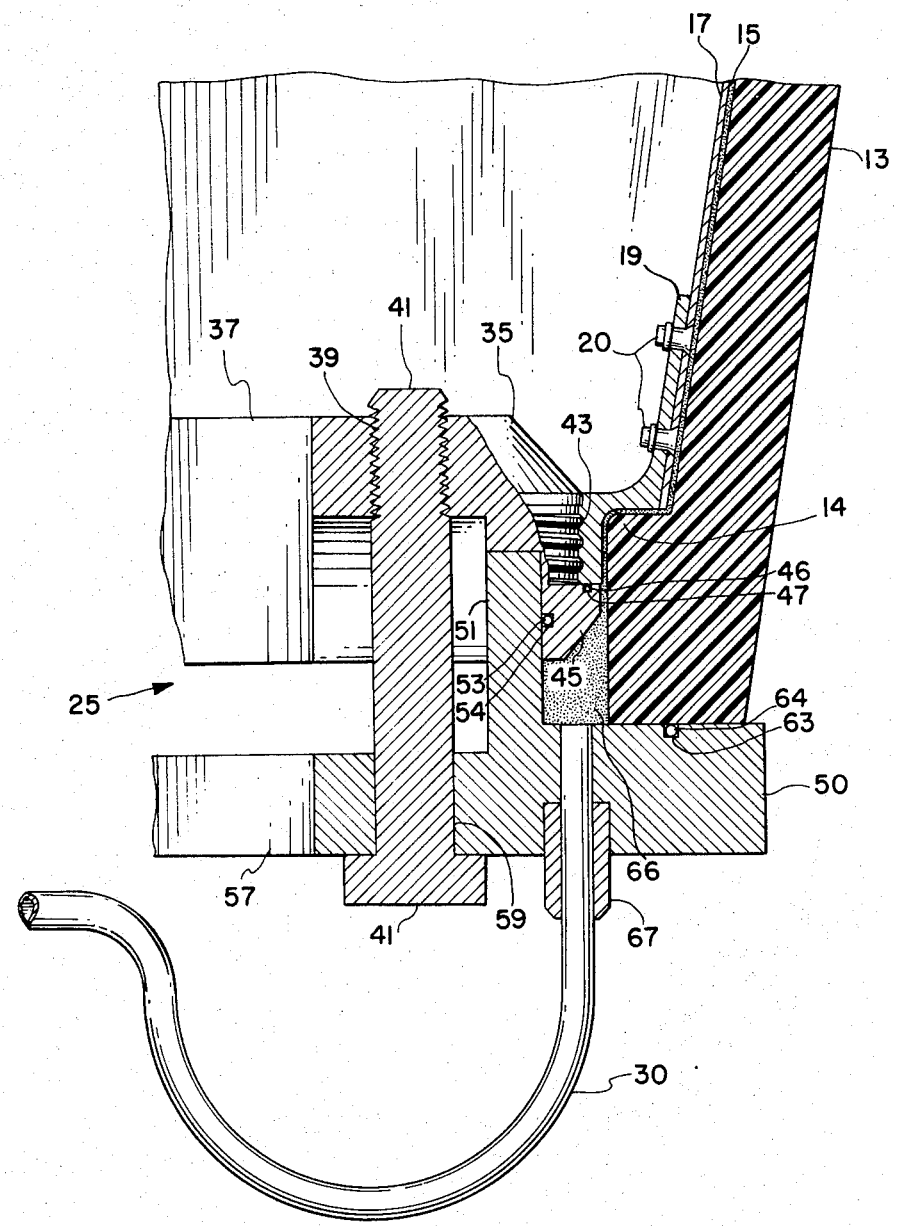
FIG. 3 is an enlarged part sectional view of a portion of the bonding fixture employed to center the polytetrafluoroethylene sleeve about the metal liner and to transfer adhesive to the gap therebetween.

Referring now to FIG. 3, the details of the bonding fixture 25, and the procedure for introducing the adhesive layer 15 between sleeve 13 and line 17, will be more readily understood. Bonding fixture 25 includes an externally threaded centrally bore tap 35, which is threadingly received by the internally threaded insert 19 within the end of liner 17. Tap 35 is formed of a durable metallic material, such for example stainless steel, and has an enlarged central bore 37 therethrough. A row of equally spaced tapped perforations, one of which is shown in FIG. 3 and designated by reference numeral 39, are disposed circumferentially adjacent bore 37 for the receipt therein of a plurality of bolts, one of which is shown and, designated by reference numeral 41. The exterior threads 43 on tap 35 terminate adjacent an enlarged annular shoulder 45. Shoulder 45 has a circumferential groove 46 on one surface thereof enclosing an O-ring seal 47 serving to seal shoulder 45 against insert 19 when the threaded tap 35 is threadingly reecived thereby. An adhesive receiver unit, or cover, 50 forms the other part of adhesive transfer bonding fixture 25. Cover 50 is provided with a circumferentially extending flange 51 which is slidably received by tap 35 so as to bear against the interior surface of annular shoulder 45. A suitable O-ring seal 53 is provided in a circumferential groove 54 in shoulder 45 to seal flange 51 thereagainst. Cover 50 is also provided with an internal aperture 57, of corresponding size to the center bore 37 in tap 35, and a row of circumferentially disposed apertures, one of which is shown and designated by reference numeral 59. Aperture 59 is in alinement with tapped perforation 39 in tap 35, when the two elements are disposed adjacent each other for receiving connecting bolts 41.

A sealing O-ring 63, disposed in an annular groove 64, hermetically seals cover 50 against sleeve 13 when bonding fixture 25 is placed in operative relationship therewith. As shown in FIG. 3, a circumferential reservoir 66 is formed between tap 35 and cover 50. Reservoir 66 serves to uniformly transfer the adhesive, as it is received through channels 30 into bonding fixture 25, to the bond line gap maintained between sleeve 13 and liner 17. As shown in FIG. 3, channels 30 are maintained in connection with fixture 25 by conventional conduit fillings 67.

Figure 4:
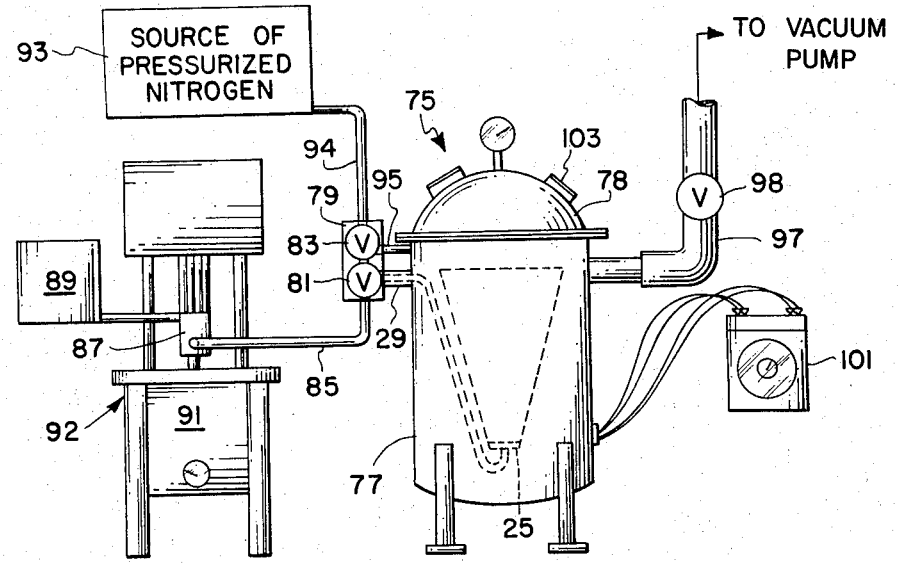
FIG. 4 is a schematic representation of the apparatus employed to achieve the vacuum-pressure adhesive bonding of the polytetrafluoroethylene sleeve to the metallic liner in accordance with the present invention.

Referring now to FIG. 4, a schematic representation of the overall apparatus employed to apply the adhesive layer 15 between sleeve 13 and liner 17 is shown, and generally designated by the reference numeral 75. Apparatus 75 includes a heated, pressure-vacuum chamber 77 in which the sleeve 13 and liner 17 are received in position to be bonded. The adhesive conduit line 29 passes through a suitable opening in vessel 77 and connects with bonding fixture 25, as described hereinbefore. The other end of conduit line 29 connects with valve fixture 79 containing valves 81 and 83. Valve 81 serves to connect adhesive conduit line 29 to adhesive feeder line 85, leading to an adhesive container disposed in adhesive mixer chamber 87. The adhesive container in mixer chamber 87 is in fluid connection with a vacuum pump unit 89 and a hydraulic pressure source 91, and forms part of a conventional mixer instrument, generally designated by reference numeral 92. A commercially available mixer of this type is the Pyles SP–1378 Mixer, available from Pyles Industries, Incorporated, Detroit, Mich.

Valve 83 serves to connect a source of pressurized nitrogen 93, by way of conduits 94 and 95, to the interior of the vacuum-pressure vessel 77. A pair of observation ports, one of which is designated by reference numeral 103, are provided in the removable closure 78 of vessel 77.

Vessel 77 is also in fluid connection by way of conduit 97, having an on-off valve 98 therein, with a suitable conventional vacuum pump, capable of evacuating vessel 77 to a controlled vacuum of approximately 125 mm. mercury pressure, and not shown. A conventional recorder-controller unit 101 is in electrical connection with the appropriate mechanism of vessel 77 and serves, in a conventional manner, to record and regulate the internal temperature conditions maintained in vessel 77 during a bonding operation.

Figure 6:
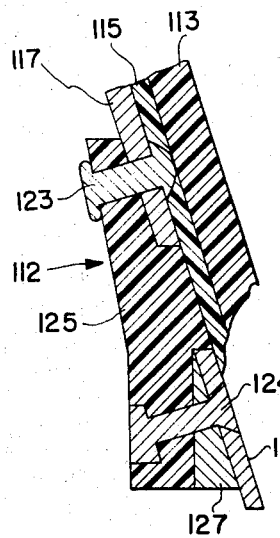
FIG. 6 is an enlarged sectional view of a modified antenna frustum having a laminate of polytetrafluoroethylene bonded thereto, in accordance with the present invention.

Referring now more particularly to FIG. 6, a section of a dipole antenna frustum 112, including metal alloy shells 117 and 118 and protective sleeve 113, is shown. Shells 117 and 118 may also be of truncated conical shape and are connected by an internally disposed dielectric ring 125 formed of, for example, a glass fabric reinforced phenolic resin laminate. Two rows of closely spaced rivets serve to connect dielectric ring 125 to shells 117 and 118, with one rivet in each row being shown and designated, respectively, by reference numerals 123 and 124. A wedge-like metal annular insert 127 is maintained between shell 118 and dielectric ring 125 by the row of rivets 124, and serves to provide structural support for the assembly.

In this embodiment, the entire row of rivets 124 are machined flush with the metal shell surface 118. The majority of the rivets in the row with rivets 123 are also similar to rivets 124 and also machined flush with shell surface 117. Selected equally spaced rivets in this row, however, are retained with round or brazier heads, as shown by rivet 123, to aid in the establishing of a controlled bond line gap, as will be further explained hereinafter.

*Bond line gap determination*

Referring now more particularly to FIGS. 1–5, sleeve 13 is machined from a solid block or a thick tubular section of Teflon stock to essentially the same internal diameter dimensions as the external diameter of the machined three percent thorium-ninety-seven percent magnesium alloy truncated conical liner 17. The thickness of sleeve 13 will vary for different thermal protective operations but the thickness along the entire length of each individual sleeve 13 employed is substantially uniform, except for the internal circumferential lip 14, as shown in FIGS. 1 and 3. Lip 14 is employed to provide obvious mechanical advantages in strength and in facilitating achievement of the desired bond line gap. Due to the dissimilar coefficients of expansion of polytetrafluoroethylene and the thorium-magnesium alloy, sleeve 113 will expand to a slightly greater degree with the expansion experienced by the alloy liner 17, when the two components are heated. This difference in expansion serves to sufficiently enlarge the interior diameter of machined sleeve 13 to that necessary for establishing the minimum bond line gap required between the two components for adhesively bonding them in permanent fixed relationship. It has been calculated that the minimum allowable gap distance between sleeve 13 and liner 17, to obtain an adequate bond while sustaining the necessary thermal protection and permitting optimum telemetry transmission by the antenna liner 17, is fourteen mils. The structural and operational tolerances of the magnesium alloy liner and the polytetrafluoroethylene sleeve govern the maximum bond gap permitted to approximately seventy-five mils. Inasmuch as polytetrafluoroethylene cannot be accurately molded or cast to precise tolerances, sleeve 13 is preferably machined from a solid block of Teflon. The internal diameter of sleeve 13 is determined, taking into consideration the coefficient of expansion of the polytetrafluoroethylene, so that when sleeve 13 and the thorium-magnesium structural shell 17 are elevated to 200° F., a gap distance averaging twenty-five mils, on the radius, should exist between the two mated components. In order to check the accuracy of the gap between the Teflon ablation shield 13 and the structural shell antenna 17, it is necessary to measure the bond line gap, as a check, before finally bonding the two components in fixed relationship. This bond line gap permits the average gap to be determined and corrections can be made to insure that the minimum gap distance it not less than the allowable fourteen mils.

To establish this bond gap check, a number of rows of equally spaced one-eighth inch brazier or round head rivets 23 are conventionally attached about the circumference of shell 17. The average height of rivets 23 employed, after setting, is seventy-five mils. With shell 17 running true and concentric in a lathe, the tips of all the rivet heads 23 are then machined at the correct taper, parallel to the outer surface of shell 17 to form a straight line, with a maximum rivet head height of seventy mils greater than the lowest indicated point on the shell 17. The remaining rivet head, after machining, remains of substantially arcuate configuration. The exterior of shell 17 is then solvent-cleaned with a methyl ethyl-1,2-ketone (MEK) solvent and primed with a suitable silicone rubber primer, such for example General Electric's SS4004 Silicon Primer, at approximately twenty selected points. The areas primed, for example, are small points spaced 90° apart, along four lines running essentially parallel with the longitudinal centerline of shell 17, and with five primer points per line. After priming, shell 17 is permitted to air dry at room temperature for at least one hour, at which time tap 35 of bonding fixture 25 is threaded into the internally threaded insert 19 at the small end of the thorium-magnesium shell 17.

Sleeve 13, after being machined to size from, for example, a solid block, or a thick tubular section, of sintered Teflon, is etched throughout its internal surface area with a suitable sodium etching solution, such for example, Tetra-Etch, a product of W. L. Gore and Associates, Inc. This etching procedure is a conventional process employed to chemically change the plastics surface by exposing carbon bonds and thereby providing a cementable surface. After being etched and dried, sleeve 13 is solvent cleaned with methyl ethyl ketone (MEK) solvent and four strips of pressure sensitive Teflon tape, of three mils thickness and at least as wide as the primed points on shell 17, are placed on the interior surface of sleeve 13, 90° apart and parallel with the longitudinal centerline thereof. Sleeve 13 is then heated to 200° F. in an air-circulating oven, not shown, with the large end up; adhesive reservoir cover unit 50 being centered and leveled under the small end thereof within the oven.

A room temperature vulcanizable silicone rubber, such for example General Electric's RTV-90, having a viscosity of approximately 12,000 poises, is then thoroughly mixed with one-half of one percent, by weight of a suitable catalyst, such for example Thermolite-12, a metallic soap catalyst, and small quantities of the catalyzed rubber applied to the primed areas of liner 17.

The polytetrafluoroethylene sleeve 13 is maintained at 200° F., and the alloy liner 17 having the silicone rubber coated areas thereon, as described above, is then lowered into sleeve 13 while maintaining concentricity between the two components to aline the pressure sensitive tapes with the rows of catalyzed rubber on liner 17. A concentric row of connecting bolts 41, (FIG. 3), are then inserted through apertures 59 of cover 50 and threaded into tapped perforations 39 of tap 35. The tightening of bolts 41 secures tap 35 and cover 50 in sealed relationship due to the O-rings 47, 53, and 64, as described hereinbefore. The thus assembled sleeve 13 and liner 17 are held in the oven at 200° F. until the silicone rubber is cured, or approximately two hours. Bolts 41 are removed, while the entire assembly is maintained at 200° F., and the thorium-magnesium liner 17 is extracted from sleeve 13. The entire structure is then allowed to cool to room temperature, the thickness of the silicone rubber patches mechanically measured, adding three mils for the thickness of the pressure sensitive tape, and the thickness and location of each silicone rubber patch noted. By comparing the thickness and location of the individual silicone rubber patches, the accuracy and/or inaccuracy of the bond line gap occurring between sleeve 13 and liner 17 at a temperature of 200° F. may then be determined. Due to the tolerances allowed in the initial machining of both the polytetrafluoroethylene sleeve 13 and the alloy liner 17, this bond line gap check may indicate that portions of the bond line gap are below the calculated accepted minimum of fourteen mils. When this is detected, it is necessary to further machine selected areas of the interior sleeve 13 to increase the gap line area at points at which this minimum allowable gap line was not present. After machining, these selected areas of sleeve 13 are then re-etched with a sodium etching solution, as described hereinbefore, to reestablish a cementable internal surface area for the sleeve, and a second bond line gap check is taken following the same procedure, as that described above. This procedure is repeated until the bond line gap throughout the surface area of the two components to be bonded is within the accepted minimum limit of fourteen mils. The bond line gap determination for a segmented liner, as shown in FIG. 6, is essentially identical to that described for FIGS. 1–5 with rivets 123 thereon being machined to govern the bond gap distance.

*Bonding procedure*

Any suitable thermosetting adhesive capable of maintaining a permanent bond between a plastics and a metal surface under sustained high temperature conditions may be employed for the bonding procedure described herein. One example of an adhesive meeting these requirements is the high temperature epoxy adhesive, Epoxylite 813–9, available from the Epoxylite Corporation of El Monte, Calif.

Epoxylite 813–9 is an ultra-high temperature potting resin supplied by the manufacturer as liquid resin with a finely divided powder catalytic agent. When ready for use, the liquid resin is heated to 175° F. and thirty-nine parts, by weight, of the catalyst are rapidly mixed with one hundred parts, by weight, of the resin with very thorough mechanical agitation being employed for at least ten minutes to insure homogeneity. After mixing, the adhesive is deaerated in a conventional manner, before being employed as the bonding agent in the present invention.

Inasmuch as adhesives of this type are of a relatively low viscosity and will adhere to substantially any contacting surface, it is necessary to seal all areas subject to possible leakage to prevent any adhesive from passing into the interior of the shell during the actual bonding operation. These areas include the area around exposed rivets 23 of FIG. 2, rivet heads 123 and 124 of FIG. 6, and the joints formed between dielectric ring 125 and shells 117 and 118, as shown in the embodiment of FIG. 6. These areas, in each embodiment, are lightly grit-blasted with a 100-grit aluminum oxide abrasive, all other areas of the respective shells being masked by masking tape, in a conventional manner, during this grit-blasting process.

Referring now more particularly to FIGS. 1–5, shell liner 17, after blasting, is placed in an air-circulating oven, and heated to 250° F. to condition the grit-blasted areas. The components of the particularly high temperature epoxy adhesive employed, that is, the resin and its catalyst or hardener, are then mixed in a conventional manner and in accordance with the particular manufacturer's recommendations, and a thin coat of the mixed adhesive applied, for example, by using a small stiff-bristled brush, to all the exterior areas of shell 17 capable of possible leakage. The shell liner 17 is then held at 250° F. for five hours, to cure the adhesive to a tack-free state and, thereafter, cooled to room temperature. The entire exterior surface of shell 17 is then grit-blasted with the 100-grit aluminum oxide abrasive to remove the now tack-free adhesive. This procedure insures that any possible areas subject to leakage would be filled with the adhesive and bonded therein so as to prevent any possible further leakage therethrough during the final bonding operation.

The externally threaded tap 35 of bonding fixture 25 is then threaded into the internally threaded insert 19 of sleeve liner 17 and a pair of annular support discs are fastened in spaced relationship within liner 17, opposite to the first two rows of rivets thereon. A magnesium ring is also positioned in the interior of liner 17 adjacent the third row of rivets or that row near the large end of the liner. These discs and ring member serve to strengthen the liner during the bonding operation and prevent possible bending or collapse thereof.

The pressure sensitive tape employed during the bond line gap check is then removed from sleeve 13 and the interior of the sleeve is again solvent cleaned with methyl ethyl ketone (MEK) solvent. Sleeve 13 is then placed in an air-circulating oven, large end up, and the adhesive reservoir unit or cover 50 of bonding fixture 25 is centered under the small end of the cone and this assembly then heated and maintained at 200° F.

The thorium-magnesium alloy liner 17 is then seated in the Teflon sleeve 13, maintaining the same alinement of the two components as used in the last bond line gap check employed, with sleeve 13 remaining in the heated oven. The bolts 41, fastening cover 50 to tap 35 of bonding fixture, are then drawn up tight to rigidly secure sleeve 13 in circumferential adjacency to liner 17 with the preestablished accurate bond line gap being maintained therebetween. The thus completed assembly is maintained at 200° F. in the oven for two hours prior to being transferred to preheated 200° F. vacuum-pressure vessel 77 (FIG. 4). The adhesive conduit line 29 extending through the sidewall of vessel is then attached to channels 30 leading to bonding fixture 25, and the friction fitting reservoir trap 33 placed in position about sleeve 13, as shown in FIG. 2, and closure 78 secured.

Adhesive feeder line 85 leading from the container in mixer chamber 87 is then connected to adhesive conduit line 29 through valve assembly 79. The feeder line 85, adhesive conduit 29 and channels 30 are of conventional copper tubing, or like construction.

A volume of the high temperature epoxy adhesive, equal to the volume of feeder line 85, adhesive conduit 29, channels 30, bonding fixture reservoir 66, the bond line gap between sleeve 13 and liner 17, the adhesive trap 33 at the large end of the assembly, and approximately ten percent in excess, is then mixed according to the manufacturers recommendation, with the preheated temperature thereof during mixing being maintained at approximately 175° F. The vacuum unit 89 in connection with the adhesive container in mixer chamber 87 serves to deaerate the adhesive components as the mixed adhesive is transferred to chamber 87, in a conventional manner. The mixed adhesive is retained in a water-bath container within chamber 87, at a temperature of 175°–200° F. After deaeration of the mixed adhesive, vacuum unit 89 is disconnected through suitable means, not shown, and a source of hydraulic pressure 91 placed in fluid connection with the adhesive container. A pressure of approximately thirty p.s.i. is achieved and maintained on the mixed adhesive for a period of approximately three minutes.

The adhesive feeder line valve 81 is then rotated to permit the mixed adhesive being forced into bonding fixture assembly 25 under the influence of this thirty p.s.i. pressure. Simultaneously therewith, a vacuum applied through line 97 is regulated to maintain vessel 77 under vacuum conditions of approximately 125 mm. mercury pressure to thereby assist in slowly pulling the adhesive from mixing unit 87 through the bonding fixture 25 and into the bond line gap established between sleeve 13 and its liner 17.

This flow of adhesive progresses slowly and uniformly about the bond line gap toward trap 33 due to the controlled pressure and vacuum acting thereon. When trap 33 becomes substantially filled, this observation being made through observation ports 103 in closure 78 of vacuum-pressure vessel 77, the vacuum line valve 98, and adhesive feeder line valve 81 are closed. The nitrogen line valve 83 is then opened to subject the interior of vessel 77 to nitrogen gas pressure from a pressurized nitrogen source to pressurize the vessel 77 and the ambient environment of the sleeve 13 and liner 17 to a pressure of ninety p.s.i. Vessel 77 is then held at 200° F. and at ninety p.s.i. nitrogen pressure for the sixteen hours necessary to cure the high temperature epoxy adhesive bond 15 and thereby permanently bond sleeve 13 in situ with liner 17.

After the sixteen hour cure cycle, vessel 17 is allowed to cool to room temperature while remaining pressurized at ninety p.s.i. The cooled and bonded assembly is then removed from vessel 77 and bonding fixture 25 threadedly extracted therefrom, after being disconnected from the adhesive conduit line 29 by way of connecting elements 67. The magnesium disc and the support rings, not shown, are then removed from the interior of liner 17, having performed their support function, and the bonded assembly subjected to an X-ray quality control check. This X-ray control check is accomplished by inserting X-ray film, maintained in curved holders, along the interior of liner 17 and exposing the film by a radiation source on the exterior of sleeve 13, in a conventional manner. Where the study of the X-rays reveals the anticipated and required void-free line 15 uniformly throughout the bonded area thereof, the assembly may then be mounted in a suitable lathe and machined, where necessary, for aerodynamic efficiency, prior to the addition of the threaded ablation nose cap 12 (FIG. 1), thereto, and the subsequent assembly of the complete nose cone structure onto space vehicle 10.

The bonding of sleeve 113 to the segmented shells 117 and 118 (FIG. 6) follows essentially the same procedure as that described for the embodiment of FIGS. 1–5. Although only two segments are shown in FIG. 6, it is apparent that multiple sections of the antenna frustum may be thermally protected by the unitary polytetrafluoroethylene sleeve 113 within the scope of this invention. Due to the presence of permanent strengthening rings 125 in this embodiment, the strengthening rings described hereinbefore to prevent collapse of shell 17 during bonding may be omitted or, if used, they may be attached directly to rings 125. Rings 125, in addition to providing dielectric separation between shell segments 117 and 118, also serve to attach the telemetry circuit components thereto, in a conventional manner, in the final nose cone assembly.

As apparent from FIGS. 5 and 6, a minimum area of rivets 23 and 123 comes in contact with the surface of the polytetrafluoroethylene sleeves 13 and 113, respectively, due to the round head rivet construction. Thus, when rivets 13 and 113 are machined to establish the controlled bond line gap, only a portion of each rivet head is removed to thereby leave an arcuate profile surface for remaining portions of the individual rivet heads 23 and 123. This rivet head construction aids in the flow of adhesive around the rivets during the bonding process due to the obvious reduced resistance offered by the arcuate surfaces. The relative amount of rivet surface area that comes in contact with the surface of the polytetrafluoroethylene sleeve is also minimized due to this modified arcuate configuration. This reduced contact area, coupled with the use of an aluminum alloy, or like relative high thermal conductive material, for making the spacer rivets 23 and 123, minimize any tendency of hot spots being developed at the rivet contact points.

Although the above described specific bonding procedure is confined to the bonding of a truncated conical sleeve about a hollow frustum liner, it is obvious to those skilled in the art that this process may be employed in the bonding of any suitable plastics lamination to any particular metallic, or nonmetallic substrate, as a jacket or a liner, where the bond line gap tolerances are critical. Also, although the plastics employed herein is polytetrafluoroethylene, or Teflon, and the liner is a thorium-magnesium alloy, it is apparent that the present invention would also be applicable for other plastics and other metals. It is thus understood that where specific materials are mentioned in the hereinbefore described process, they are given as illustrative examples only and, equivalent materials may be employed in the process and are considered within the scope of the present invention. It is also apparent that the specific location and number of rivets employed in the determination of the bond line gap as disclosed herein are given by way of illustration only and, except as specifically claimed, the specific spacers described are not to be considered as limitations of the present invention.

There are obviously many other modifications and variations of the present invention readily apparent to those skilled in the art in the light of the above teachings. It is therefore to be understood that within the scope of the appended claims the invention may be practiced otherwise than as specifically described.

What is claimed as new and desired to be secured by Letters Patent of the United States is:

1. A method of bonding a thermally protective plastics lamination to a metallic surface comprising:
   heating a metallic surface and a plastics lamination for said metallic surface to approximately 200° F. under controlled conditions,
   fixedly positioning the plastics lamination and the metallic surface relative to each other so as to provide a controlled-gap distance therebetween,
   forcing a low viscosity thermosetting resin between the plastics and metallic surface to completely fill the gap distance therebetween,
   subjecting the resulting structure to controlled ambient pressure within a pressure chamber while maintaining the chamber temperature at approximately 200° F. for approximately sixteen hours to cure the thermosetting resin and thereby permanently bond said plastics lamination to said metallic surface,
   cooling the bonded structure to room temperature while maintaining it under pressure.

2. A method of bonding a plastics sleeve onto a metallic frustum comprising:
   providing a metallic frustum and a plastics sleeve of conforming shape for said frustum,
   chemically cleaning the interior surface of said plastics sleeve and the exterior of said metallic frustum,
   positioning said sleeve in a uniform, spaced, fixed relationship about said frustum,
   filling the space between said sleeve and said frustum with a thermosetting adhesive,
   subjecting the resulting structure to controlled elevated ambient pressure and an elevated temperature to cure said adhesive and bond said sleeve to said frustum,
   cooling the bonded structure to room temperature while maintaining the controlled elevated ambient pressure.

3. The method of claim 2 wherein said plastics sleeve is polytetrafluoroethylene.

4. The method of claim 2 wherein the step of filling the space between said sleeve and said frustum is accomplished by forcing the adhesive in the space at the small end of the sleeve and frustum under pressure while simultaneously inducing a vacuum at the large end of the assembly.

5. A method of bonding a truncated plastics sleeves to a hollow metallic frustum comprising the steps of:
   solvent cleaning the interior surface of the plastics sleeve,
   providing the hollow metallic frustum with a plurality of individual projections arranged in a number of circumferentially disposed rows,
   machining said projections so as to present end portions thereof parallel with the metallic frustum surface and the maximum height of which is the maximum allowable bond gap permitted between said sleeve and said frustum,
   fixedly positioning the plastics sleeve about said frustum so as to engage said projections and be maintained thereby a controlled-gap distance from the metallic frustum surface,
   heating the two components to approximately 200° F. under controlled environmental conditions,
   forcing a low viscosity thermosetting resin between the plastics and metallic surface to completely fill the gap distance therebetween,
   subjecting the resulting structure to controlled ambient pressure within a pressure chamber while
      (a) curing the resin by maintaining the ambient temperature at approximately 200° F. for approximately sixteen hours, and
      (b) cooling the structure to room temperature.

6. The method of claim 5 wherein said plastics sleeve is polytetrafluoroethylene and said hollow frustum is a thorium-magnesium alloy.

7. The method of claim 6 wherein said alloy is 3 percent thorium and 97 percent magnesium.

8. The method of claim 5 wherein said frustum includes at least two truncated conical segments, said segments being maintained in rigid connection by an annular dielectric spacer.

9. The method of claim 8 wherein said dielectric spacer is connected to said segments by a plurality of circumferentially disposed rivets, selected ones of said rivets being provided with exposed semispherical heads and constituting said projections.

10. The method of claim 9 including the step of sealing the area around each of said plurality of rivets and the joints formed with said dielectric spacer and said segments with an adhesive prior to fixedly positioning the plastics sleeve about said frustum to thereby prevent leakage of the thermosetting resin when the resin is forced into the gap between said sleeve and said frustum.

11. A method of accurately controlling the bond line gap between two tapered tubes to be adhesively bonded together comprising the steps of:
   providing a surface of a first tube with a plurality of relatively small projections arranged in longitudinally and circumferentially disposed rows and each said individual projection being machined to present end surfaces essentially parallel with said first tube surface, physically attaching a second tube in engagement with the end surfaces of said projections to thereby provide a gap distance between said first and second tubes a distance equal to the height of said projections, forcing an adhesive between said first and second tubes to completely fill the gap distance therebetween, and subjecting the resulting structure to a controlled environment to cure said adhesive.

12. The method of claim 11 wherein said tubes are constructed of materials having dissimilar coefficients of expansion and including the step of heating both said tubes to approximately 200° F. and maintaining this temperature during the attachment and bonding of said second tube to said first tube.

13. A method of establishing a controlled bond line gap distance between a metallic liner and a sleeve of another material, comprising the steps of:

providing a metallic liner with a plurality of relatively small arcuate, radial projections circumferentially spaced along the exterior surface thereof, machining the exposed surface of said projections essentially parallel to the exterior surface of said line and to a height substantially equal to the calculated maximum bond line gap desired between said sleeve and said liner, chemically cleaning the exterior liner surface, applying removable pressure sensitive tape of known thickness over longitudinal interior portions of a unitary sleeve of another material, heating said sleeve and said liner to effect thermal expansion thereof, priming selected small circumferentially spaced areas of the clean and heated liner surface with a silicone primer, covering the primed liner areas with small quantities of a catalyzed room temperature vulcanizable silicone rubber, positioning said heated liner relatively fixed in centered engagement within said heated sleeve with silicone coated areas of said liner being alined with the removable pressure sensitive tape in said sleeve of another material, heating the resulting structure to cure the silicone rubber, extracting said liner from said sleeve, the pressure sensitive tape of said sleeve preventing adherence thereto of said silicone rubber, permitting cooling of the liner to room temperature, and thereafter measuring the thickness of each of the cured silicone rubber areas now adhered to said liner, taking into account the added thickness of the pressure sensitive tape within said sleeve, to thereby give an accurate measurement of the bond line gap distance present between said liner and said sleeve at each said area.

14. The method of claim 13, including the additional steps of:

permitting said sleeve to cool to room temperature, removing the pressure sensitive tape from within said sleeve, machining the sleeve to increase the effective internal diameter thereof at selected points wherein the measured bond line gap is indicated below accepted minimum thickness, and thereafter repeating the cleaning, priming, rubber coating, curing and measuring steps to again determine if the bond line gap achieved is of an acceptable minimum value.

15. A method of bonding a thermal protective polytetrafluoroethylene sleeve onto a truncated conical metallic alloy shell for use as a telemetry antenna component on a reentry space vehicle, comprising the steps of:

providing a machined truncated conical shell formed of a thorium-magnesium alloy, providing a machined sleeve of polytetrafluoroethylene of conforming shape for said shell, said alloy and said sleeve having the physical property characteristics of dissimilar coefficients of expansion, chemically cleaning the interior of said sleeve and the exterior of said alloy frustum, heating the cleaned sleeve and alloy shell to a temperature of approximately 200° F. where, due to the dissimilar coefficients of expansion, said sleeve expansion will exceed the thermal expansion of said thorium-magnesium alloy shell, positioning said expanded sleeve in circumferential relationship about said alloy shell, fixedly securing said sleeve a controlled-gap distance from the conforming exterior of said alloy shell, completely filling said gap distance with a thermosetting adhesive, said adhesive having the physical property characteristics of adhering to both said alloy and said sleeve when cured, subjecting the resulting structure to controlled elevated ambient pressure and an elevated temperature to cure said adhesive and thereby permanently bond said sleeve to said truncated conical shell.

16. A method of bonding a polytetrafluoroethylene sleeve to a metallic liner, comprising the steps of:

providing a metallic liner with a plurality of radial projections circumferentially disposed about the surface of said liner, said projections being machined to equal lengths with the exposed end surfaces thereof being essentially parallel to the external surface of said liner, positioning said liner within a unitary sleeve of polytetrafluoroethylene, the inner diameter of which has been machined such that it is maintained spaced a uniform distance from the external surface of said liner by said radial projections when the two components are heated to 200° F., forcing a thermosetting adhesive into the space between said sleeve and said liner while maintaining an ambient temperature environment of approximately 200° F., providing an ambient pressure of approximately ninety p.s.i. while continuing the ambient temperature of approximately 200° F. to cure said adhesive and thereby permanently bond the two components, permitting the ambient temperature to drop to room temperature while maintaining the bonding ambient pressure conditions.

17. A method of making a thermally protected hollow telemetry antenna component to be used as the structural nose cone of a reentry space vehicle, comprising the steps of:

providing a machined hollow metallic frustum with a plurality of individual, radial projections arranged in a number of circumferentially disposed rows, machining said projections so as to present end portions thereof parallel with the metallic frustum and the maximum height of which is the maximum allowable bond gap permitted between said sleeve and said frustum, providing a polytetrafluoroethylene sleeve of conforming shape for said frustum, heating the metallic frustum and polytetrafluoroethylene sleeve to approximately 200° F., fixedly positioning said heated frustum within the heated polytetrafluoroethylene sleeve, said projections engaging said sleeve to provide a controlled gap distance between said sleeve and said frustum, pressure forcing a quantity of a low viscosity thermosetting resin between the plastics and metallic surface to completely fill the gap distance therebetween, subjecting the resulting structure to controlled ambient pressure within a pressure chamber while
    (a) curing the resin by maintaining the ambient temperature at approximately 200° F. for approximately sixteen hours, and
    (b) cooling the structure to room temperature, and employing the bonded structure as a structural component of a reentry vehicle nose cone in position to serve as a telementry antenna for the reentry vehicle.

18. The method of claim 17 including:

said radial projections being round-head rivets with only a minor portion of the round head surface area thereof being removed when machined to thereby minimize the rivet surface area coming in contact with said polytetrafluoroethylene sleeve, and said polytetrafluoroethylene sleeve being machined from a solid block of sintered stock and sodium-etched on the interior surface area thereof to provide a cementable surface area therein.

19. A method of bonding a thermoplastic polymer sleeve to a liner of another material to provide a thermal protective jacket for said other material, comprising the steps of:

providing a thermoplastic polymer sleeve and a liner of another material of conforming shape for said sleeve, attaching a metal insert within one end of said liner, said metal insert being provided with a reduced diameter portion adapted to extend from the end of said liner and having an annular threaded inner surface, securing a plurality of radial metallic projections along the exterior surface of said liner, machining the ends of said radial projections essentially parallel to the exterior surface of said liner and of a height substantially equal to a calculated maximum bond line gap permissible between said sleeve and said liner, positioning the polymer sleeve about said liner so as to engage said radial projections, said sleeve having an internal lip on one end thereof with a conforming inner surface of said lip extending radially toward the reduced diameter portion of said metal insert and longitudinally beyond the end of said metal insert, threadingly securing an annular metallic tap to said metal insert, said tap having an annular shoulder portion internally spaced from the longitudinal extension of said sleeve lip and adapted to be hermetically sealed to said insert, slidably inserting a closure within said annular tap, portions of said closure being adapted to be hermetically sealed to the shoulder of said tap and portions of said closure forming an annular plate adapted to be hermetically sealed against the radial end of said sleeve lip, said closure and said tap forming the housing for an annular adhesive reservoir, said reservoir being so constructed and arranged as to be in fluid communication with the bond line gap between said sleeve and said liner and in fluid communication with an adhesive source, securing said closure to said tap to hermetically seal the closure to the radial end of said sleeve lip and to the shoulder on said tap to thereby fixedly retain said sleeve in a controlled bond line gap distance from said liner, vertically positioning the fixed structure, the closure end thereof being positioned at the bottom, in a preheated pressure-vacuum chamber, slowly forcing a low viscosity thermosetting adhesive through said closure into said reservoir and completely filling the bond line gap between said sleeve and said liner, providing controlled ambient pressure of approximately ninety p.s.i. and a temperature of approximately 200° F. in said pressure-vacuum vessel for approximately sixteen hours to cure said adhesive and permanently bond said sleeve to said liner, and reducing the vessel temperature to room temperature while maintaining the pressurized environment.

20. Apparatus for bonding a metallic hollow frustum and a unitary thermal protective plastics sleeve in situ the improvement therewith, comprising in combination:

a vacuum pressure vessel having a removable closure and provided with observation ports in said closure, a bonding fixture positionable within said vessel and serving to secure a plastics sleeve and a metallic frustum at the small ends thereof in fixed nested relationship, a pressurized source of thermosetting adhesive and means providing fluid communication between said source and said bonding fixture, an annular adhesive reservoir formed in said bonding fixture and so constructed and arranged as to be in fluid communication with the space formed between the metallic frustum and plastics seleve, vacuum means in fluid communication with the interior of said vessel and the space formed between the nested frustum and sleeve to direct an assisting force on adhesive flowed through said bonding fixture into the spacing between the nested frustum and sleeve, a circumferential overflow adhesive trap within said vessel and retained about the large end of the sleeve when the nested components are disposed vertically with the large end thereof located in the top position, and said vacuum-pressure vessel including means for curing said adhesive when the spacing between the nested components is completely filled with adhesive, as indicated by the flow of adhesive progressively filling said overflow trap and viewable by an operator through said observation ports.

References Cited

UNITED STATES PATENTS

| | | | |
|---|---|---|---|
| 2,424,878 | 7/1947 | Crook | 156—294 |
| 2,724,672 | 11/1955 | Rubin | 156—294 X |
| 2,809,130 | 10/1957 | Rappaport | 117—138.8 |
| 2,871,144 | 1/1959 | Doban | 117—138.8 |
| 3,230,129 | 1/1966 | Kelly | 156—294 X |

EARL M. BERGERT, *Primary Examiner.*

HAROLD ANSHER, *Examiner.*